Nov. 26, 1968  A. E. O'KEEFFE  3,412,935
GAS DISPENSING DEVICES
Filed Aug. 31, 1966  5 Sheets-Sheet 1
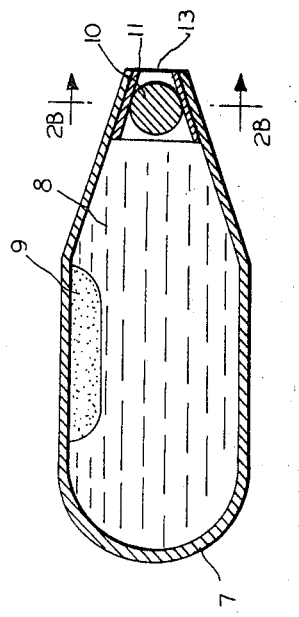
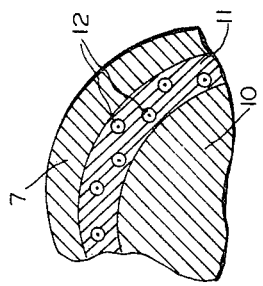
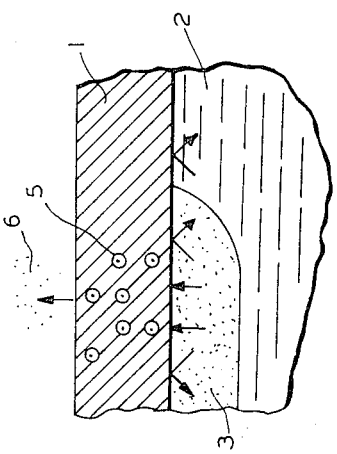
INVENTOR
ANDREW E. O'KEEFFE
BY  *H. F. Cleeves*
ATTORNEY Nov. 26, 1968   A. E. O'KEEFFE   3,412,935
GAS DISPENSING DEVICES
Filed Aug. 31, 1966   5 Sheets-Sheet 2
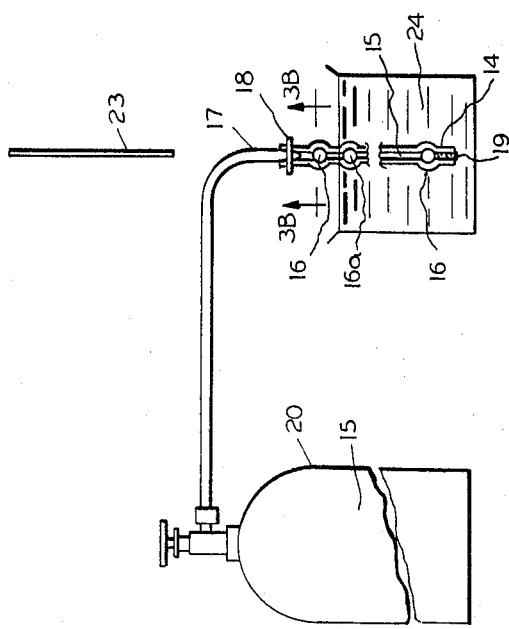
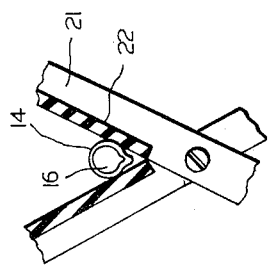
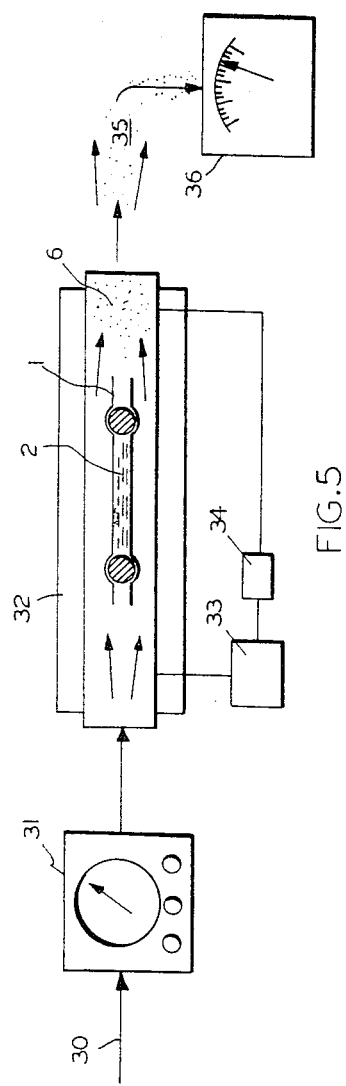
INVENTOR
ANDREW E. O'KEEFFE
BY
H. F. Cleaner
ATTORNEY Nov. 26, 1968 A. E. O'KEEFFE 3,412,935
GAS DISPENSING DEVICES
Filed Aug. 31, 1966 5 Sheets-Sheet 3

INVENTOR
ANDREW E. O'KEEFFE

BY
*H. J. Cleaner*
ATTORNEY

United States Patent Office 3,412,935
Patented Nov. 26, 1968

3,412,935
GAS DISPENSING DEVICES
Andrew E. O'Keeffe, Cincinnati, Ohio, assignor to the United States of America as represented by the Secretary of Health, Education, and Welfare and the Secretary of Agriculture
Filed Aug. 31, 1966, Ser. No. 576,351
2 Claims. (Cl. 239—34)

ABSTRACT OF THE DISCLOSURE

A device for emitting a constant, known, precise amount of gas into a surrounding fluid medium comprises a sealed vessel containing a normally gaseous substance in equilibrium with its liquid phase. The walls of the vessel may be permeable to the gas over their entire area or only a portion of the vessel may be permeable. Rate of emission varies with temperature; but remains constant at any given temperature from the time the first bubble of gas appears (in a vessel originally completely filled with liquefied gas) until the time when the last drop of liquid is exhausted.

---

The present invention is concerned with a method and device for introducing a gas into a fluid (i.e., gaseous or liquid) medium in a precisely controlled fashion.

It is often desirable to generate a mixture of one gas in another or a solution of a gas in a liquid and, in many cases, it is further desirable to be able to know and control with certainty the exact quantity of the one gas being so admixed or dissolved. Foreknowledge of the precise composition of a gaseous mixture or solution is of great value in (inter alia):

(1) The calibration of an instrument or method for analyzing similar mixtures, as in the study of air pollution;

(2) The study of physiological effects of air pollutants on animals, plants or materials of construction;

(3) The dispensing of an insect-repellent or insecticidal substance by an accessory article of apparel in order to protect the wearer against an insect pest;

(4) The chloridation of fluoridation of a body or stream of water;

(5) The administration of a drug;

(6) The emission of a scent, as from an article of jewelry;

(7) The fumigation of an infected space.

Various devices and methods have been employed heretofore in attempts to generate gaseous mixtures in precisely controllable fashion. Gravimetric, barometric, volumetric and diffusion methods are described in the following references:

Altshuller, A. P., and I. R. Cohen, Anal. Chem., 32, 802 (1960);

Bassett, P. M., and P. W. Polfreman, Chem. Ind. (London), 1965 (44), 1840;

Cotabish, H. N., P. W. McConnaughey and H. C. Messer, Am. Ind. Hyg. Assoc. J. 22, 392 (1961);

Guillaume, H. G., Pittsburgh Conference on Analytical Chemistry and Applied Spectroscopy, Paper No. 97 (1964);

Hill, D. W. and H. A. Newell, J. Sci. Instrum. 42, 783 (1965);

Saltzman, B. E., Anal. Chem. 33, 1100 (1961);

Christian, R. G. and J. H. Leck, J. Sci. Instrum. 43, 229 (1966).

These techniques either require delicate and sometimes cumbersome apparatus for their operation, or are imprecise in the results they produce, or both.

The present invention is particularly useful and advantageous in that it enables a mixture of any desired concentration to be generated with ease, simplicity and precison. (It should be noted, however, that this method is best suited to preparation of very dilute mixtures). Its precison and accuracy are sufficient that it can serve as a direct source of primary standard quantities of calibration gases.

The device of the present invention embodies other advantageous features. Its size is such as to simplify shipment, as when it is desired to compare the analytical results of two or more laboratories. Its assembly is so simple that it can be accomplished by semi-skilled personnel after a minimum of instruction. Its useful life can easily be extended to a period of months or years, thus providing the analyst with primary standards which are virtually permanent.

Various other uses and advantages of the present invention will become apparent from the following detailed description when considered in connection with the accompanying drawings in which:

FIG. 1A is a longitudinal section view of one preferred embodiment of the device;

FIG. 1B is an enlarged fragmentary section view of a portion of FIG. 1A;

FIG. 2A is a longitudinal section view of another preferred embodiment of the device;

FIG. 2B is an enlarged fragmentary transverse section view taken along the line 2B—2B in FIG. 2A;

FIG. 3A is a longitudinal section view of the device of FIG. 1, depicting a preferred method of assembling and filling;

FIG. 3B is an enlarged transverse section of FIG. 3A, showing the method of filling in greater detail;

FIG. 5 is a generally diagrammatic showing of a preferred method of using the device of FIG. 1 for generating a mixture of a gas in air.

Figure 4A:
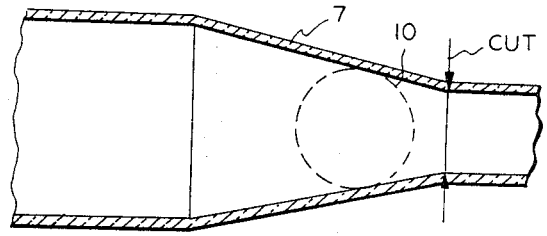
FIG. 4 is a longitudinal section view of the device of FIG. 2A, depicting a preferred method of assembling and filling.

The principle of the invention whereby a gas is emitted from a permeable polymeric plastic container at a constant rate is shown in FIG. 1A and 1B. The container 1, a length of plastic tubing of uniform cross-section, is partially filled with liquefied permeand 2 (in the present example, $SO_2$), the remaining space being occupied by gaseous permeand 3 in equilibrium with liquefied permeand 2. The permeand is confined under its own vapor pressure by steel or glass balls 4 inserted in each end of the container 1. In FIG. 1B the process of permeation is depicted in diagrammatic fashion. Liquid (2) and gaseous (3) molecules of permeand collide with the inner surface of the container 1; a portion of such molecules 5 become dissolved in the substance of the container wall 1 and, under the influence of the pressure within container 1, diffuse outward until they reach the outer surface of container 1, where they evaporate and mix with the surrounding atmosphere, as indicated by a small number of gaseous permeand molecules 6.

FIGS. 2A and 2B illustrate another embodiment of the device of the invention, particularly adapted to the generation of extremely dilute gaseous mixtures in which, for example, one volume of a given gas may be dispersed in $10^{12}$ volumes of a second gas. Container 7 is made of glass, metal or other impermeable material and encloses liquefied (8) and gaseous (9) permeand, confined under its own vapor pressure by the ball 10, of the same material as container 7, which is enclosed in a short section of polymeric plastic tubing 11, said ball 10 and tubing 11 engaging the tapered inner wall of said container 7 adjacent to the opening thereof 13. It will be evident that this embodiment operates in a manner analogous to that previously described for the embodiment of FIGS. 1A and 1B but that the polymeric plastic permeation path is drastically reduced in area in this second embodiment. In FIG. 2B, a diagrammatic representation is given of dissolved permeand molecules 12 in the process of diffusing, normal to the plane of the drawing, axially along tubing 11.

In FIGS. 3A and 3B there is shown one method of assembling and filling the embodiment of FIG. 1A. Tubular ramrod 23 is used to force balls 16 into the ends of polymeric plastic tube 14, one end of which is then connected to a cylinder 20 of the gas being charged 15 by means of the tapered metal tube 17. With cylinder pressure applied to the system, gas is permitted to flow past upper ball 16 by squeezing gently on tubing 14 surrounding said upper ball 16, using pliers 21 having resiliently padded jaws 22, as shown in FIG. 3B. Cooling the device by immersing in ice water 24 induces condensation of gas 15 within the device. When the space between balls 16 is nearly filled with liquefied gas, the device is removed from tapered tube 17, and upper ball 16 is farther inserted to its final position 16a, using ramrod 23. When charging a substance whose vapor pressure is above about 2 atm., it is desirable to reenforce the junction of tubing 14 to tapered metal tube 17 with nut 18 and to insert ball-retaining screw 19; a similar ball-retaining screw (not shown) is also inserted in the opposite (upper) end of tubing 14 after upper ball 16 has been placed in its final position 16a.

Figure 4B:
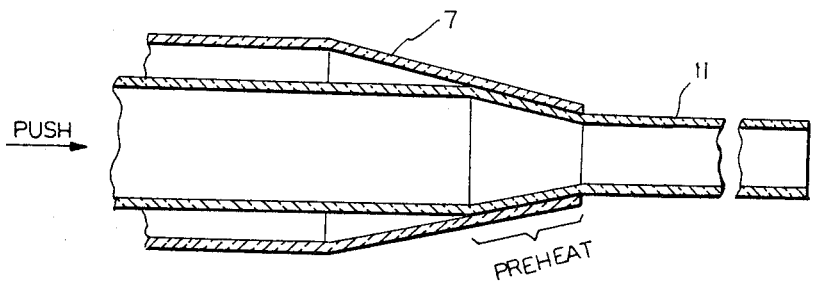
Figure 4C:
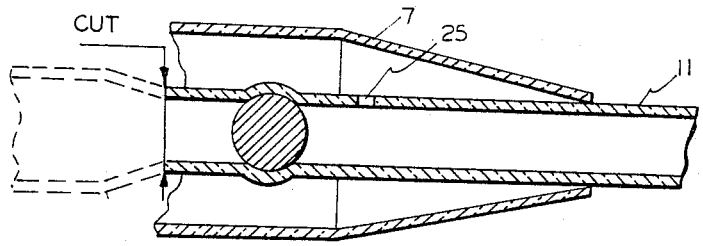
Figure 4D:
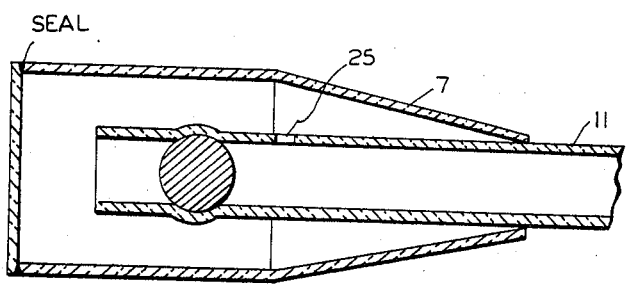
Figure 4E:
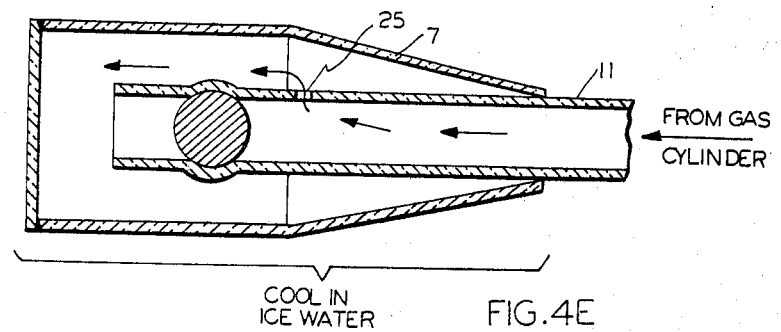
Figure 4F:
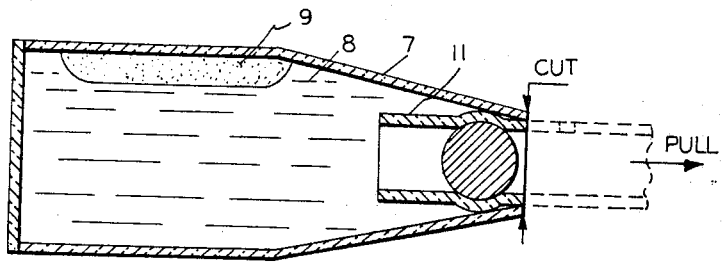
Figure 4G:
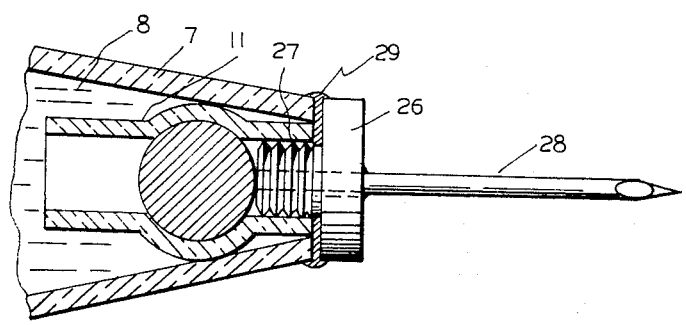

FIGS. 4A–G show, in stepwise fashion, the fabrication and assembly of the embodiment of FIG. 2. The tapered section of container 7 is made by drawing down a glass tube (FIG. 4A), cutting off and fire-polishing at a point where the internal diameter is such as to prevent passage of glass ball 10. While the tip of container 7 is still hot, polymeric plastic tube 11 is extruded therethrough (FIG. 4B). Glass ball 10 is inserted in tube 11 and hole 25 is drilled through the wall of tube 11 between ball 10 and the tip of container 7; the remaining larger diameter portion of tube 11 is cut off and discarded (FIG. 4C). The end of container 7 opposite the tip is sealed (FIG. 4D). The free end of tube 11 is connected to a gas cylinder and pressurized while container 7 is cooled in ice-water (FIG. 4E), inducing condensation of the gas being charged within container 7. The distal section of tube 11 is grasped with a forceps and pulled forcibly until the section of tube 11 which contains ball 10 engages the tapered inner wall of container 7 and effects closure thereof (FIG. 4F). To provide a passage, having minimum dead volume, for egress of the permeate, brass adapter 26, carrying hollow needle 28, is inserted by means of thread 27 in the end of tube 11 and sealed therein with epoxy cement 29 (FIG. 4G).

FIG. 5 is a generally diagrammatic showing of a preferred method of using the device of this invention to generate a mixture of a gas in air. Source 30 supplies air, measured through precision gas meter 31, to jacketed tube 32. Thermostat 33 and pump 34 cooperate to force a stream of water at constant temperature through the jacket of tube 32. Within tube 32, the stream of air passes over permeation tube 1 containing permeand 2, during which process it is impregnated with the gaseous permeate 6 escaping from tube 1, as has been previously described in FIGS. 1A and 1B. The resulting gas mixture 35 emerges from tube 32 and is then available for use (for example) in calibrating air monitoring instrument 36.

In a specific embodiment of the device of the present invention, liquefied sulfur dioxide was confined within a length of the fluorinated ethylene-propylene copolymer known as FEP Teflon (Du Pont) having an inside diameter of 0.085 inch and a wall thickness of 0.016 inch by means of two 3 mm. glass balls spaced 35.7 cm. apart. Periodic weighings demonstrated that, after an initiation period of about one day, this tube emitted sulfur dioxide as shown in the following Table:

TABLE I

| Temperature, °C.: | Rate of $SO_2$ emission |
|---|---|
| 13.8 | nanograms/cm./min__ 111 |
| 20.1 | nanograms/cm./min__ 203 |
| 29.1 | nanograms/cm./min__ 396 |

Similar results were obtained when tubes filled with other gases were weighed periodically. The relationships of emission to temperature for four gases is shown graphically in FIG. 6.

Figure 6:
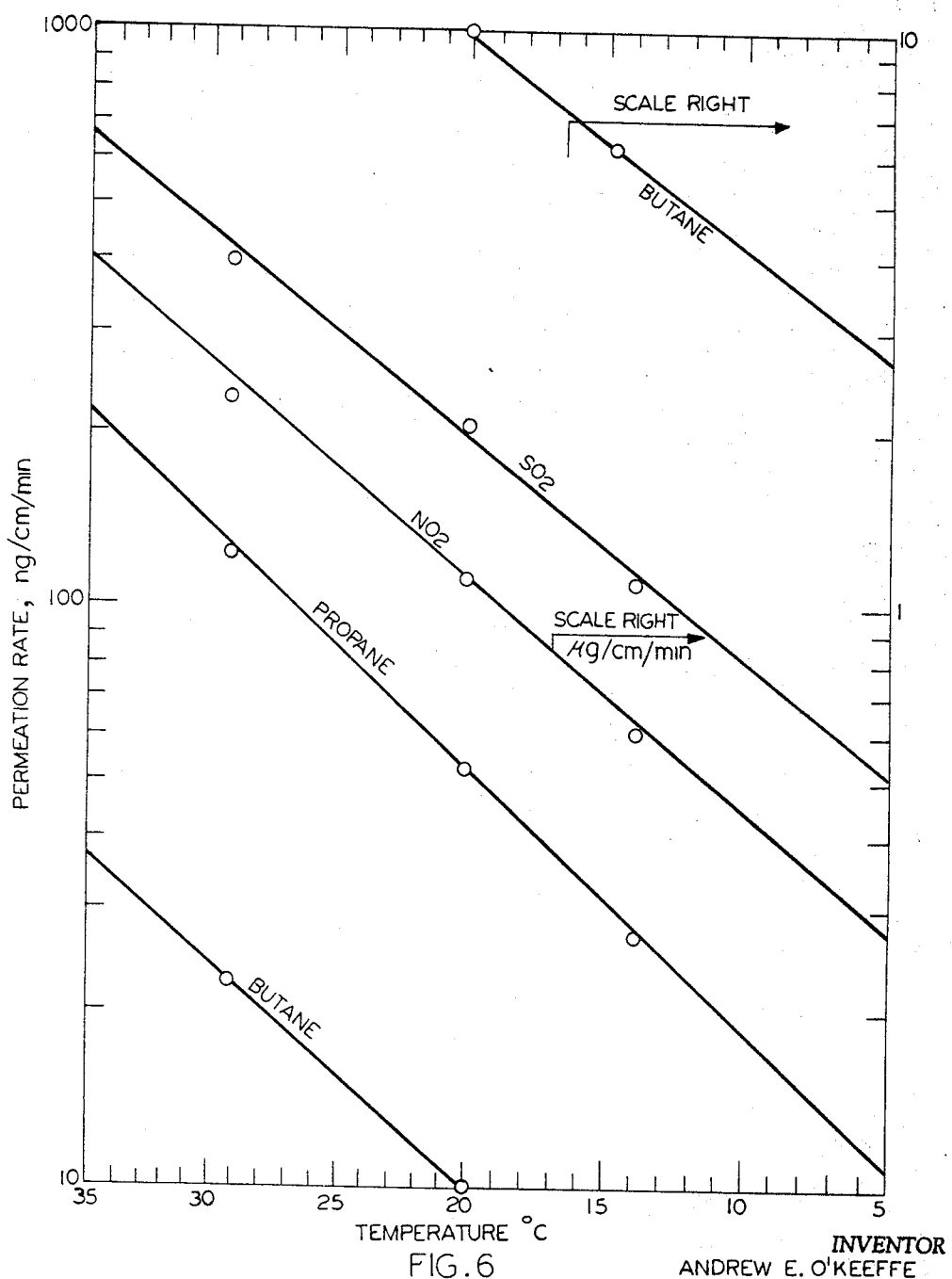
FIG. 6 is a graph illustrating the relationship between the temperature at which the device is operated and the output of several typical gases.

In a specific embodiment of the method of the present invention, a length of fluorinated ethylene-propylene copolymer tubing, 0.085 inch inside diameter, having a wall thickness of 0.016 inch, and containing propane confined between two steel balls 75.6 cm. apart was enclosed in the apparatus shown in FIG. 6, adjusted to maintain said tube at a constant temperature of 25.0° C., was exposed to a stream of air flowing at 50 ml. per minute. The resulting propane-air mixture, monitored by a sensitive flame ionization analyzer, displayed a constant concentration of 73.0 ±0.5 p.p.m. propane over a period of 72 hours.

I claim:
1. A device for controllably emitting a normally gaseous substance into a surrounding fluid medium which comprises a sealed vessel in which a portion of said substance is in the gaseous phase in equilibrium with its compressed liquid phase, said vessel comprising an elongated tubular member of a polymeric plastic material permeable to the gas and a seal impermeable to said gas within the tubular member adjacent each end thereof.

2. A device for controllably emitting a normally gaseous substance into a surrounding fluid medium which comprises a sealed vessel in which a portion of said substance is in the gaseous phase in equilibrium with its compressed liquid phase, said vessel being entirely impermeable to said substance, said vessel having an opening, an impermeable seal entirely within said opening, a permeable polymeric plastic material interposed between said seal and an adjacent inner wall of the vessel, said seal bearing solely against said plastic material.

References Cited

UNITED STATES PATENTS

| 3,065,915 | 11/1962 | Samann | 239—58 XR |
| 3,169,705 | 2/1965 | Geiger | 239—34 XR |
| 3,283,787 | 11/1966 | Davis | 239—34 XR |
| 3,310,235 | 3/1967 | Zbinden | 239—34 XR |

WALTER SOBIN, *Primary Examiner.*